(12) United States Patent
Ishida

(10) Patent No.: US 6,695,379 B1
(45) Date of Patent: Feb. 24, 2004

(54) STRUCTURE FOR LOAD DETECTION ELEMENT IN VEHICLE SEAT

(75) Inventor: Toshiaki Ishida, Akishima (JP)

(73) Assignee: Tachi-S Co., Ltd., Tokyo (JP)

( * ) Notice: Subject to any disclaimer, the term of this patent is extended or adjusted under 35 U.S.C. 154(b) by 0 days.

(21) Appl. No.: 10/412,422

(22) Filed: Apr. 14, 2003

(51) Int. Cl.[7] .............................................. B60N 2/02
(52) U.S. Cl. ........................ 296/65.14; 296/65.13; 280/735; 180/273; 73/795
(58) Field of Search .................... 296/65.14, 65.13; 280/735; 180/273; 177/211; 73/795, 849, 862.621; 297/217.1

(56) References Cited

U.S. PATENT DOCUMENTS

| | | | | |
|---|---|---|---|---|
| 4,948,189 A | * | 8/1990 | Terada et al. .............. | 296/65.13 |
| 6,039,344 A | * | 3/2000 | Mehney et al. ............. | 280/735 |
| 6,231,076 B1 | * | 5/2001 | Blakesley et al. .......... | 180/273 |
| 6,394,490 B2 | * | 5/2002 | Osmer et al. ............... | 280/735 |
| 6,397,688 B1 | * | 6/2002 | Sakamoto et al. .......... | 280/735 |
| 6,407,347 B1 | * | 6/2002 | Blakesley .................... | 280/735 |
| 6,407,350 B1 | * | 6/2002 | Blakesley .................... | 177/211 |
| 6,494,482 B2 | * | 12/2002 | Curtis .......................... | 280/735 |
| 6,520,023 B2 | * | 2/2003 | Kimura ........................ | 73/795 |
| 6,586,948 B1 | * | 7/2003 | Aoki et al. .................. | 280/735 |
| 2002/0062699 A1 | * | 5/2002 | Kimura ........................ | 73/795 |
| 2003/0015041 A1 | * | 1/2003 | Bruns ........................... | 73/849 |
| 2003/0067196 A1 | * | 4/2003 | Sakamoto et al. ......... | 297/217.1 |
| 2003/0085060 A1 | * | 5/2003 | Becker et al. ............... | 280/735 |
| 2003/0131671 A1 | * | 7/2003 | Ishida et al. ............ | 73/862.621 |
| 2003/0177847 A1 | * | 9/2003 | Ishida .................... | 73/862.627 |

FOREIGN PATENT DOCUMENTS

| | | | |
|---|---|---|---|
| JP | 2002 166768 | * | 6/2002 |
| JP | 2002 168682 | * | 6/2002 |

* cited by examiner

*Primary Examiner*—Kiran Patel
(74) *Attorney, Agent, or Firm*—Browdy and Neimark, P.L.L.C.

(57) ABSTRACT

Structure for securing a load detection element under a vehicle seat in combination with a support leg element having a hole formed in one end portion thereof, wherein the load detection element is pivotally connected with the support leg element, while being fixedly secured by first and second securing pins to the vehicle seat. The first pin has an end riveted to a bottom side of the vehicle seat and an end portion extending through the hole of support leg element. Such another end portion has a head larger in diameter than that hole and is disposed outwardly under the support leg member, with one space given between the head and support leg member. The second pin has a end fused and fixed in the bottom side of vehicle seat and a head disposed beneath the load detection element, with another space given between the head and support leg member.

4 Claims, 3 Drawing Sheets

STRUCTURE FOR LOAD DETECTION ELEMENT IN VEHICLE SEAT

BACKGROUND OF INVENTION

1. Field of the Invention

The present invention relates to a load detection element for detection of a load applied to a vehicle seat, the load detection element being of such a type wherein a longitudinally elongated strain plate member is provided, which extends along the fore-and-aft direction of the vehicle seat and wherein a load detection device having a strain gauge is provided under the seat such that the strain gauge detects an amount of deflection of the strain plate member which is caused by a load applied to the seat and gives a numerical data indicative of the deflection amount. In particular, the invention is directed to a structure for securing this kind of load detection element between the bottom of vehicle seat and a floor of the vehicle.

2. Description of Prior Art

Various automatically controlled functions and mechanisms have been increasingly incorporated in vehicle or automobiles, including safety devices such as air bags for protecting passengers against a great impact automatically in response to a collision. With such automated control innovations, there have been also found technical improvements to a passenger detection system for detecting the presence and absence of a passenger or driver in a seat of vehicle in advance before actuating or stopping the associated mechanical elements to automatically control various functions and mechanisms built in the seat.

Normally, the passenger detection system or a load detection structure employs sensors which can detect a load in terms of presence and absence of passenger on a seat, and recent high-tech control technology has developed sensors capable of detecting a degree of load whether the passenger is an adult or a child as with air bag control system for instance.

In most cases, a slide rail device, which typically comprises a lower rail and an upper rail slidably fitted in the lower rail, is provided under the seat to thereby allow for free forward and backward movement of the seat. In that case, a known load detection structure to be provided between the slide rail device and the seat is such that a load detection means used therein comprises: support leg members for supporting those slide rail device and seat upon the floor of a vehicle; and strain elements of deflectable property, each of which is pivotally connected with each of the support leg members at the pivotal end portion thereof and firmly secured to the lower rail of the slide rail device at the securing portion thereof, as disclosed for example from the U.S. Pat. No. 6,520,023.

Recently, it has been required that the support leg members of the load detection structure should be able to be mounted on various uneven surfaces of the vehicle floor which has been found in different kinds of vehicles and automobiles due to their own different designs.

Further, normally, the securing portion of each strain element is firmly secured to the lower rail by means of rivet pins. However, the riveted ends of the rivet pins which project in the lower rail, which undesirably limits the fore-and-aft movement range of the upper rail slidingly movable in and along the lower rail.

SUMMARY OF THE INVENTION

In view of the above-stated drawbacks, it is therefore a primary purpose of the present invention to provide an improved structure for securing a load detection means for detecting a load applied to a seat in a vehicle seat, which is greatly simplified in structure with reduced number of constituent elements and effective in avoiding undesired increase in height of the seat and reducing projected portions between a vehicle seat and the load detection means to thereby allow the seat to be mounted on uneven floor, while preventing damage and breakage of the load detection means when an excessive great load is applied thereto.

In order to accomplish such purpose, in accordance with the present invention, in combination with a floor of vehicle, there is basically provided a structure for securing a load detection means under a bottom side of the vehicle seat and in a support leg means for supporting the vehicle seat upon the floor of vehicle, the support leg means including; a bottom wall; one end facing to a side forwardly of the vehicle seat; and another end facing to a side backwardly of the vehicle seat, wherein the load detection means is adapted to detect a load applied from an occupant on the vehicle seat and comprises: a resiliently deflectable strain means having an elongated body extending along a fore-and-aft direction of the vehicle seat; an upper side facing to the bottom side of the vehicle seat; a lower side facing to the bottom wall of the support leg means; a securing end portion; a pivotal end portion; and a deflectable portion defined between the securing and pivotal end portions; and a strain gauge means fixedly attached to the deflectable portion, wherein the resiliently deflectable strain means is rotatably journalled at the pivotal end portion thereof by a pivot pin within the support leg means, such that the securing end portion of the resiliently deflectable strain means is disposed adjacent to either of the one and another ends of the support leg means, whereas the pivotal end portion of the resiliently deformable means is oriented to a center of the support leg means, wherein a hole is formed in the bottom wall of the support leg means at a point adjacent to either of the one and another ends of the support leg means, wherein a first securing pin is provided in the securing end portion of the resiliently deflectable strain means at a point near to either of the one and another ends of the support leg means, the first securing pin having an end fixedly connected with the bottom side of the vehicle seat, and wherein a second securing pin of a fusible property having a head portion and an end is provided in the securing end portion of the resiliently deflectable strain means at a point distant from either of the one and another ends of the support leg means, such that the end of the second securing pin is fused in the bottom side of the vehicle seat, while the head portion of the second securing pin is disposed on the lower side of the resiliently deformable means, with one predetermined space given between the head portion of the second securing pin and the bottom wall of the support leg means.

Accordingly, as only the head portion of first securing pin projects, there is no other projection under the support leg means, thereby allowing the seat to be mounted on any uneven floor, and further, when an excessive great downward load is applied to the vehicle seat, causing the resiliently deflectable strain means to deflect downwardly to a level in excess of the one predetermined space, the head portion of the second securing pin is brought to contact with the bottom wall of the support leg means, thereby protecting the deflectable portion of the resiliently deflectable strain means against a deflection in excess of a tolerable range in which the strain gauge means works for detection of the amount of deflection.

In one aspect of the present invention, a slide rail device may be provided between the load detection means and the bottom side of vehicle seat, the slide rail device comprising: a lower rail fixed to the bottom side of vehicle seat, the lower rail having a flat bottom surface and one end; and an upper rail slidably fitted via a plurality of rollers in the lower rail, wherein the plurality of rollers are movably interposed between the flat bottom surface of the lower rail and the upper rail, In this mode, a first hole may be formed in the flat bottom surface of the lower rail at a point near to the either of the one and another ends of the support leg means; a second hole may be formed in the flat bottom surface of lower rail at a point distant from either of those one and another ends of support leg means; a hole formed in the bottom wall of support leg means in alignment with the first hole; such that the end of the second securing pin is fused and fixed in the second hole so as to be flush with the flat bottom surface of lower rail, while the head portion of the second securing pin is disposed on the lower side of the strain element, with a second predetermined space given between the head portion of the second securing pin and the inner surface of the bottom wall of the support leg means; the end of the small-diameter portion extending upwardly through the securing end portion of resiliently deflectable strain means and is riveted to the second hole of the lower rail.

Accordingly, this aspect of the invention provides an extended flat surface region on which the rollers are smoothly rolled and moved on and along the lower rail, so that the range of forward and backward movement of the upper rail along the lower rail (18) is increased.

Over various effects and advantages of the present invention will become apparent from reading of the description hereinafter, with reference to the annexed drawings.

DETAILED DESCRIPTION OF PREFERRED EMBODIMENT OF THE INVENTION

Figure 1:
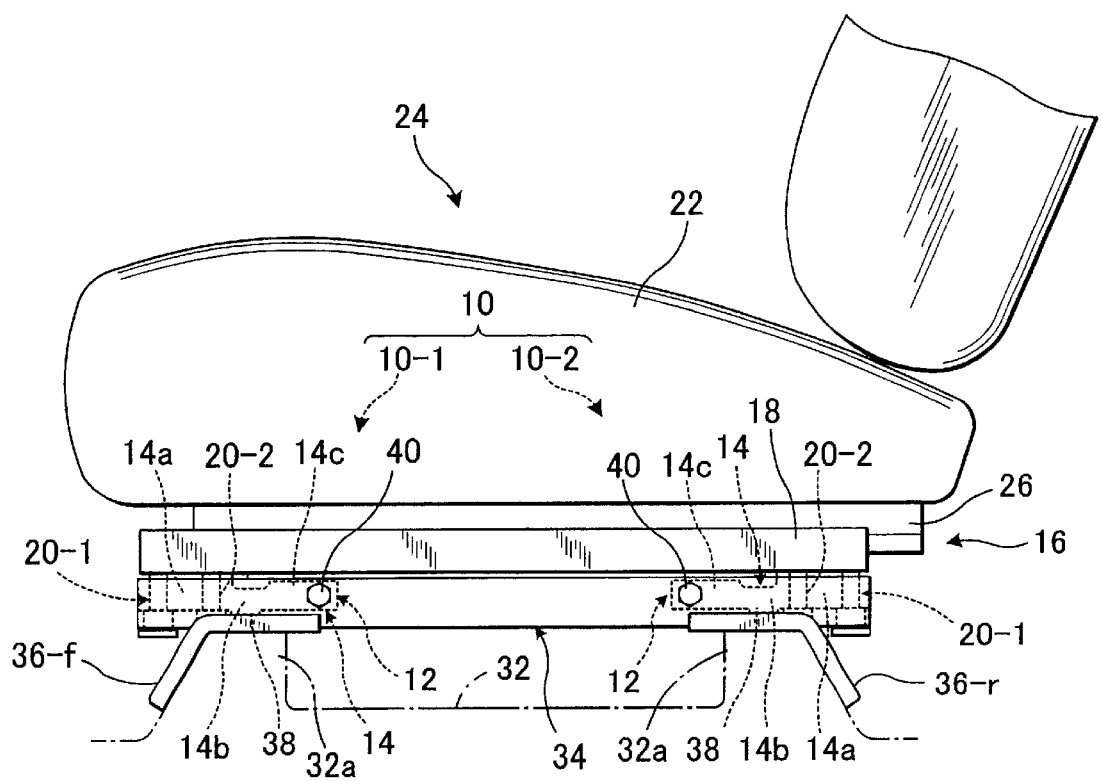
FIG. 1 is a partly broken schematic side elevational view showing the stated where load detection structures of the present invention are provided in a vehicle seat.

Referring to FIGS. 1 through 4, there is illustrated one preferred mode of structure for securing a load detection means in a vehicle seat in accordance with the present invention. Reference is first made to FIG. 1 in which designation (10) generally represents a structure for securing a load detection means between a slide rail device (16) and a support leg member (34) in a novel simplified manner. This structure shall be simply referred to as "securing structure" hereinafter.

Figure 3:
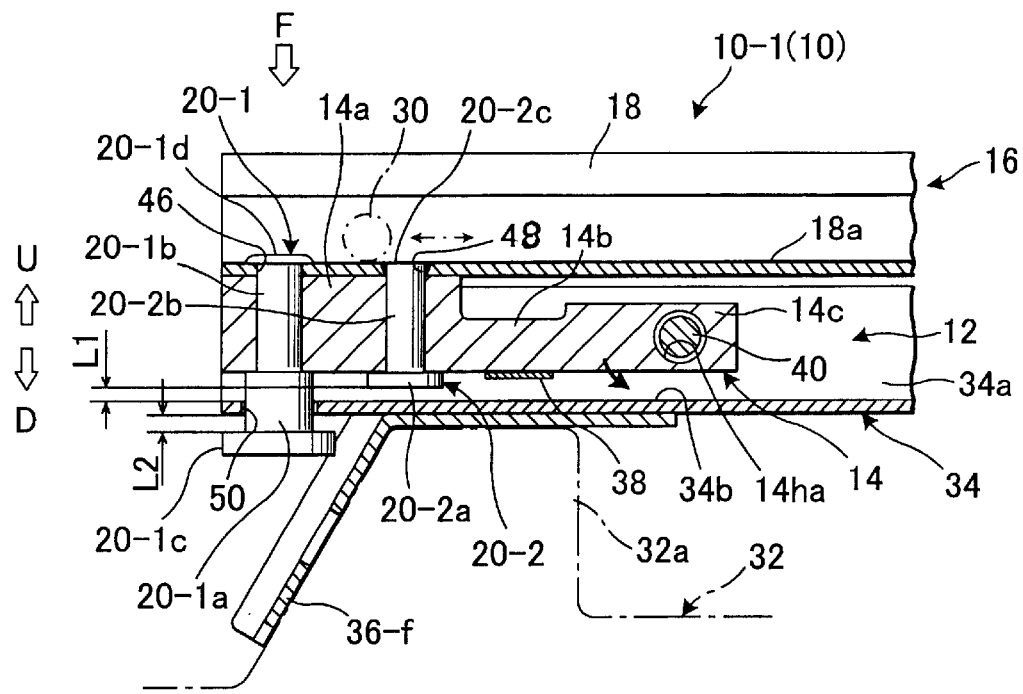
FIG. 3 is a fragmentary sectional view of the principal part of the load detection structure.
Figure 4:
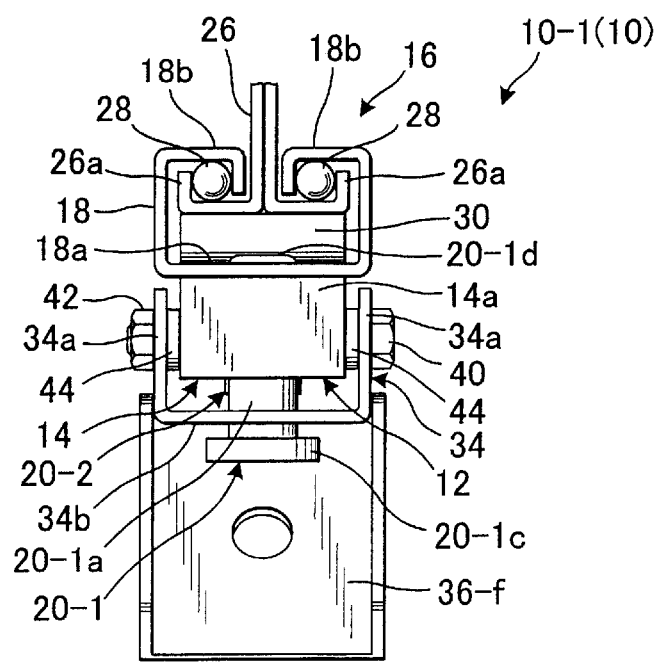
FIG. 4 is a partly broken front view showing the principal part of the load detection structure.

As is known, the slide rail device (16) comprises a stationary lower rail (18) to be fixed on a floor (32) of a vehicle (not shown) and a movable upper rail (26) slidably fitted in and along the lower rail (18). The typical configuration of such slide rail device (16) is shown in the figures, wherein the movable upper rail (26) is of a generally inverted-T-shape cross-section which is slidably accommodated within the lower rail (18) via steel balls (28) and steel rollers (30). More specifically, as shown in FIGS. 3 and 4, the lower rail (18) is of a generally "U" shape in cross-section including a bottom wall (18a) and a pair of upper wall portions (18b) (18b) each being of a generally "r" shape in cross-section. On the other hand, the upper rail (26) of inverted-T-shaped cross-section has a pair of upturned end portions (26a) (26a) defined at the lower base portion thereof. Therefore, as best seen from FIG. 4, the steel rollers (30) are movably interposed between the flat bottom wall (18a) of the lower rail (18) and the bottom portion of upper rail (26), whereas the steel balls (28) are interposed between the upper wall portions (18b) of the lower rail (18) and both bottom portion and upturned end portions (26a) of the upper rail (26).

As seen from FIG. 1, the upper rail (26) is fixedly attached to a seat cushion (22) of a vehicle seat (24) whereas the lower rail (18) is securely and operatively attached via the securing structure (10) upon the support leg member (34). As shown, in the illustrative embodiment, on the floor (32), there are formed a pair of spaced-apart upward protrudent regions (32a) (32a), and therefore, the support leg member (34) has a pair of donwardly extending forward and backward securing leg portions (36-f) (36-r), each being of a suitable shape that can be placed on and along those two upward protrudent regions (32a) (32a), respectively.

Though not shown clearly, in fact, both slide rail device (16) and support leg member (34) are each provided in pair. Namely, a pair of slide rail devices (16) are provided under the bottom of seat cushion (22) and a pair of support leg members (34) are provided for supportively receiving those two slide rail devices (16) thereon, respectively. Of course, the securing structure (10), a principal part of the present invention, is interposed between each slide rail device (16) and each support leg member (34), and therefore, a pair of securing structures (10) are arranged under the seat (24).

According to the embodiment shown in FIG. 1, the securing structure (10) is divided into forward and rearward securing structures (10-1) (10-2) which are respectively disposed in the forward and rearward regions of a mutually mated pair of lower rail (18) and support leg member (34). Therefore, as far as the present embodiment is concerned, while not shown, it follows that a pair of forward securing structures (10-1 ) are so arranged forwardly of the seat (24) that they are respectively disposed in the forward regions of left-side mated pair of lower rail (18) and support leg member (34) and in the forward regions of right-side mated pair of lower rail (18) and support leg member (34), whereas a pair of rearward securing structures (10-2) are so arranged rearwardly of the seat (24) that they are respectively disposed in the rearward regions of right-side mated pair of lower rail (18) and support leg member (34) and in the rearward regions of left-side mated pair of lower rail (18) and support leg member (34). Since all the securing structures (10-1) (10-2), the pair of slide rail devices (16) and the pair of support leg members (34) are identical in structure to one another, description will be made only of one forward securing structure (10-1) in one of the two slide rail devices (16) and one of the two support leg members (34), for the sake of simplicity.

The securing structure (10) includes a load detection means (12) workable to detect an amount of a load (F) applied vertically from an occupant on the seat (24).

In accordance with the present invention, the load detection means (12) comprises a strain element or a block member (14) in the illustrated embodiment, and a strain gauge (38) for detecting a deflection of the block member (14) which is caused by a difference in movement and direction between the pivotal rotation and vertical displacement occurred in the block member (14) as will be described later.

The strain gauge (38) is attached tight (via an adhesive for example) on the bottom side of the block member thin intermediate portion (14b) for detecting an amount of strain or deflection mentioned above, which is caused in the block member (14). While not shown, the strain gauge (38) is of a known type comprising an electrical insulating thin plate and a metallic resistance wire embedded sinuously in that thin plate. Of course, the insulating thin plate (46) is of an elastic property and may be resiliently deformable. The strain gauge (38) is not imitative, but may be formed in any otherwise manner insofar as it can detect the deflection of block member (14).

Figure 2:
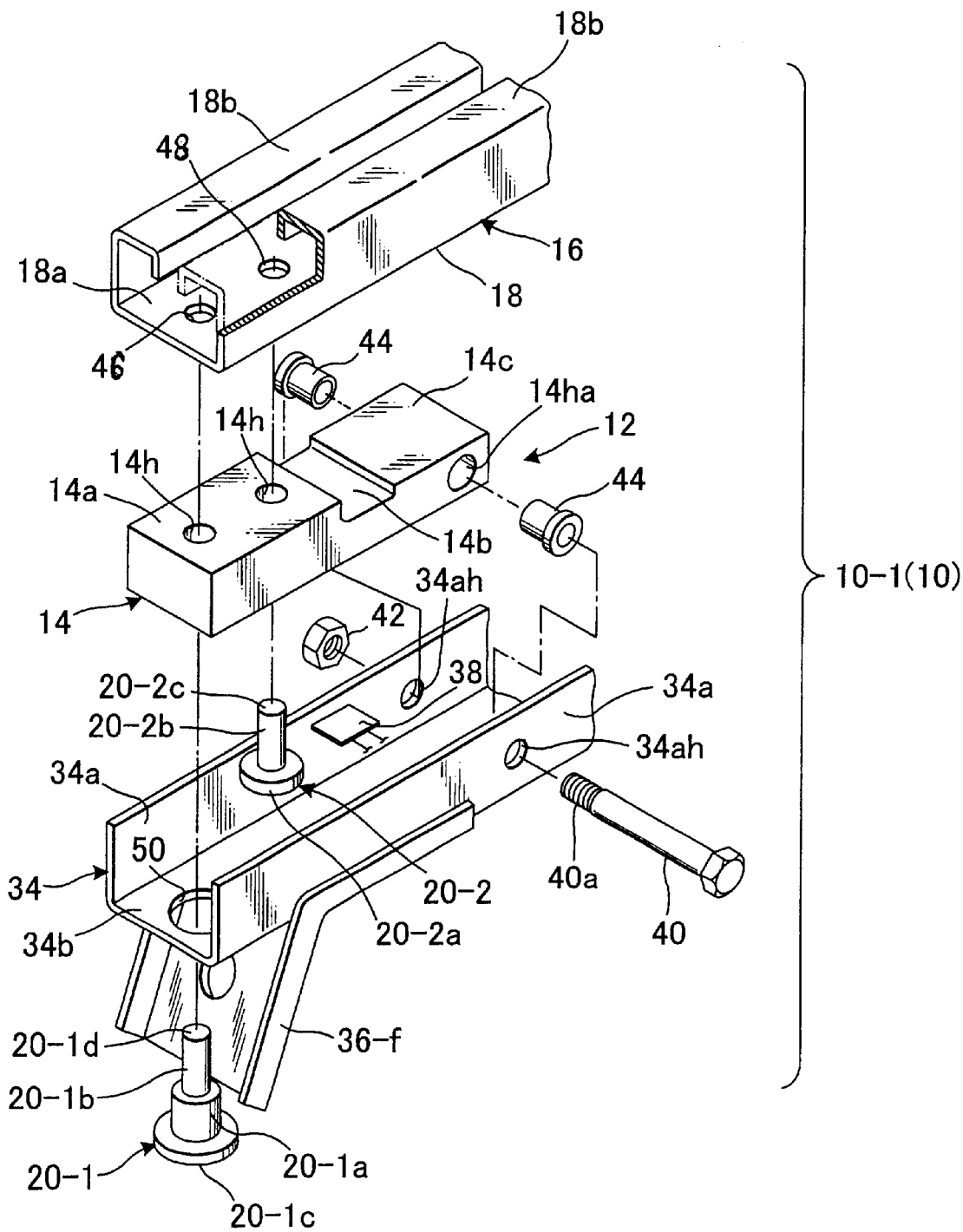
FIG. 2 is a partly broken, exploded perspective view showing a principal part of the load detection structure.

The block member (14) is generally of a longitudinally extending plate-like configuration which elongates its body lengthwise, thus having a body of large longitudinal length with a small width relative thereto, as seen from FIGS. 2 and 3. Also, it is formed from a rigid yet resiliently deformable material having a property that tends to recover into its original shape even when subjected to deformation by a great external load applied thereto. As best shown in FIGS. 2 and 3, the block member (14) is so formed to have, defined therein, a pivotal end portion (14c), a securing end portion (14a) which is relatively larger in heightwise thickness than the pivotal end portion (14c), and a thin intermediate portion (14b) which is formed relatively thin heightwise between those two portions (14a) (14c). It is thus observed from FIG. 2 that the upper surface of the pivotal end portion (14c) is lower than the upper surface of the securing end portion (14a), which allows the pivotal end portion (14c) per se to rotate about the pivot point (at 40). The thin intermediate portion (14b) is defined by forming a cutout region in the corresponding upper half of intermediate area of block member (14) such that the cutout region penetrates or extends transversely thereof. As will become apparent later, the thin intermediate portion (14b) is a point providing a vertical resilient bendability of the block member (14) relative to the pivot point (at 40 or 34) of the end portion (14c).

As in FIGS. 2 and 3, the block member (14) is further formed with a pair of vertically extending securing through-bores (14h) (14h) which penetrate vertically in and through the securing portion (14a) thereof. On the other hand, formed in the bottom wall (18a) of lower rail (18) are a pair of spaced-apart first and second securing holes (46) (48) which are respectively in a coaxial relation with those two securing through-bores (14h) (14h). A hole (50) is formed in the bottom wall (34b) of support leg member (34) such that the hole (50) is disposed at a point in the proximity of the forward end of the support leg member (34). The block member (14) is also formed with a horizontally extending bearing through-bore (14ha) in the pivotal end portion (14c) thereof, wherein it is seen that the bearing-bore (14ha) extends transversely of the pivotal end portion (14c).

Designations (20-1) (20-2) denote a first securing pin and a second securing pin, respectively. As far as the present embodiment is concerned, the first securing pin (20-1) is a rivet-type pin whose one end can be riveted, and is so formed to have a circular flat head (20-1c), a large-diameter shank portion (20-1a), and a small-diameter shank portion (20-1b) defined integrally together, wherein the free end (20-1d) of the small-diameter shank portion (20-1b) can be riveted. The second securing pin (20-2) is a fusible pin having a circular flat head (20-2a), a shank portion (20-2b) and a free end (20-2c). As will be described, the free end (20-2c) of second securing pin (20-2) is fusible. It is noted that the diameters of the securing through-bore (14h) and first securing hole (46) are generally equal to or slightly larger than the outer diameter of the small-diameter shank portion (20-1b) of first securing pin (20-1), and that the diameter of the hole (50) is larger than the outer diameter of the larger-diameter shank portion (20-1a) of first securing pin (20-1), but smaller than the outer diameter of the flat head (20-1c) of the same pin (20-1).

Designations (34ah) (34ah) respectively denote a pair of bearing holes respectively formed in a pair of vertical walls (34a) (34a) of support leg member (34) in a mutually relation with each other.

In assembly, as understandable from FIG. 2, the pivot pin (40) is inserted through the two bearing holes (34ah) of support leg member (34) and the bearing through-bore (14h) of block member (14), via two oilless bushes (44) (44), and then the threaded end portion (40a) of pivot pin (40) is threadedly engaged about the threaded end portion (40a) of pivot pin (40). Thus, the pivotal end portion (14c) of block member (14) is rotatably coupled via the pivot pin (40) with the support leg member (34). In other words, the block member (14) is pivotally journalled, at the pivotal end portion (14c) thereof, between the two vertical walls (34a) of support leg member (34) by means of the pin (40).

Next, the shank portion (20-2b) of the second securing pin (20-2) is inserted through the securing through-bore (14h), and then, the free end (20-2c) thereof is positioned in the second securing hole (48) formed in the lower rail (18), such that the upper flat surface of that particular free end (20-2c) is flush with the flat inner surface of the bottom wall (18a) of the lower rail (18). Under that state, the free end (20-2c) is fused and fixed in the second securing hole (48) formed in the lower rail (18), as can be seen in FIG. 3.

Thereafter, the small-diameter shank portion (20-1b) of the first securing pin (20-1) is passed through the hole (50), the securing through-bore (14h) and the first securing hole (46) until the shoulder of the large-diameter portion (20-1a) of securing pin (20-1) is abutted against the bottom surface of block member (12). Finally, the free end portion (20-1d) of small-diameter shank portion (20-1b) of securing pin (20-1) is riveted as seen in FIG. 3.

In that way, the securing end portion (14a) of block member (14) is firmly fastened to the bottom wall (18a) of lower rail (18).

In this regard, the large-diameter shank portion (20-1a) of the first securing pin (20-1) extends downwardly through the hole (50), with a small clearance given peripherally thereof, to thereby space the large-diameter shank portion (20-1a) from the surrounding circular edge of the hole (50), while on the other hand, the circular flat head (20-1c) of the securing pin (20-1) is situated at a predetermined level below the bottom wall (34b) of support leg member (34).

As shown in FIG. 3, the block member (14) normally extends horizontally in parallel with the horizontally extending bottom wall (34b) of support leg member (34) In this context, it is observed from FIGS. 1 and 3 that, with regard to the forward securing structure (10-1), the first securing pin (20-1) is disposed adjacent to the forward ends of both lower rail (18) and support leg member (34), whereas the second securing pin (20-2) is disposed at a point oriented to a center of the support leg member (34), and that, as regards the rearward securing structure (10-2), the first securing pin (20-1) is disposed adjacent to the backward ends of both lower rail (18) and support leg member (34), whereas the second securing pin (20-2) is disposed at a point oriented to the center of support leg member (34).

In accordance with the present invention, it is appreciated that the fused end (20-2c) of second securing pin (20-2) is flat and flush with the flat inner surface of the lower rail bottom wall (18a), and that a first limited space (L1) is given between the flat end surface of the circular head (20-2a) of second securing pin (20-2) and the inner surface of the support leg member bottom wall (34b), whereas a second limited space (L2) is given between the circular head (20-1c) of first securing pin (20-1) and the outer surface of the support leg member bottom wall (34b).

With the above-described securing structure (10), it can be seen from FIG. 3 that, when a vertical load or a weight of occupant on the seat (24), as designated by (F), is applied to the slide rail device (16), the corresponding downward force is directly imparted to the securing end portion (14a) of block member (14), thus causing downward displacement of that particular securing end portion (14a) as indicated by the downward arrow (D) and, concurrent therewith, the pivotal end portion (14c) of the same block member (14) is caused by such downward displacement to rotate downwardly, as indicated by the downward curved arrow, relative to the pivot pin (40). As a result thereof, a deflection is caused in the thin intermediate portion (14b), in response to which, the strain gauge (38) immediately detects an amount of such deflection, determines it as a weight of the occupant on the seat (24), and emits a corresponding electric signal to a control unit (not shown).

In accordance with the present invention, when an excessive great load in excess of the normal load (F) (i.e. the weight of a passenger) is applied to the seat (24), causing the bock member (14) to deflect downwardly to a level in excess of the first limited space (L1), the head (20-2a) of second securing pin (20-2) is brought to contact with the inner surface of support leg member bottom wall (34b), thereby protecting the thin intermediate portion (14b) of block member (14) against undesired deflection in excess of tolerable range in which the strain gauge (38) can work for precise detection of the deflection amount of that particular intermediate portion (14b). Conversely, if an upward excessive force is applied to the seat (24), causing the block member (14) to deflect upwardly to a level in excess of the second limited space (L2), then the circular head (20-1c) of first securing pin (20-1) is brought to contact with the outer surface of support leg member bottom wall (34b) (precisely stated, the region circumscribing the hole (50)), thereby protecting the thin intermediate portion (14b) of block member (14) against undesired deflection in excess of the tolerable range. Therefore, it is appreciated that such contact between the support leg member bottom wall (34b) and either of first securing pin head portion (20-1c) and second pin head portion (20-2a) effectively protects the block member (14) against damage and deformation, and that those two pin head portions (20-1c) (20-2a) themselves serve as a stopper means for limiting vertical excessive movement of the block member (14). Thus, only the two securing pins (20-1) (20-2) suffice for that limiting purpose and there is no need for providing any other separate stopper elements and complicated stopper means.

Further, in accordance with the present invention, the fact that the fused end of second securing pin (20-2) is flat and flush with the flat inner surface of the lower rail bottom wall (18a) advantageously provides an extended flat surface region on which the steel rollers (30) are smoothly rolled and moved as indicated by one-dot chain lines in FIG. 3, which means that the range of forward and backward movement of the upper rail (26) along the lower rail (18) is increased. In this respect, while not shown, of course, the first securing pin (20-1) may be of such fusible pin wherein the end portion (20-1d) of its small-diameter shank portion (20-1b) is fusible, and such end portion (20-1d) be positioned in the first securing hole (46) formed in the lower rail (18) such that the upper flat surface of that particular end portion (20-2c) is flush with the flat inner surface of the bottom wall (18a) of the lower rail (18). Then, the end portion (20-1d) is fused and fixed in the first securing hole (46), likewise as second securing pin (20-2) is fused and fixed in the second securing hole (48) as understandable from FIG. 3. In that case, it is possible to attain a further extended flat surface region on which the steel rollers (30) are smoothly rolled and moved and increase the range of fore-and-aft movement of the upper rail (26) with respect to the lower rail (18). However, it is better to use the rivet-type first securing pin (20-1) because the protrudent riveted end portion (20-1c) thereof serves to prevent removal of the rollers (30) from the lower rail (18), which eliminates the necessity of providing any other separate stopper element for that purpose.

Finally, it should be understood that the present invention is not limited to the illustrated embodiment, but any other modifications, replacements and additions may be structurally applied thereto without departing from the scopes of the appended claims. For example, the securing structure (10) may be provided between the seat (24) and the support leg member (34), without using the slide rail device (16), by directly fastening the block member securing end portion (14a) to the bottom of seat (24).

Further, the present invention may also be applied to any other protection device than air bag and seat adjustment devices, as well as to various kinds of seats usable in a train, aircraft or vessel.

What is claimed is:

1. In combination with a floor of vehicle and a vehicle seat, a structure for securing a load detection means under a bottom side of said vehicle seat and in a support leg means for supporting said vehicle seat upon said floor of vehicle, said support leg means including; a bottom wall; one end facing to a side forwardly of said vehicle seat; and another end facing to a side backwardly of said vehicle seat, wherein said load detection means is adapted to detect a load applied from an occupant on said vehicle seat and comprises: a resiliently deflectable strain means having an elongated body extending along a fore-and-aft direction of said vehicle seat; an upper side facing to said bottom side of said vehicle seat; a lower side facing to said bottom wall of said support leg means; a securing end portion; a pivotal end portion; and a deflectable portion defined between said securing and pivotal end portions; and a strain gauge means fixedly attached to said deflectable portion, wherein said resiliently deflectable strain means is rotatably journalled at the pivotal end portion thereof by a pivot pin within said support leg means, such that said securing end portion of said resiliently deflectable strain means is disposed adjacent to either of said one and another ends of said support leg means, whereas said pivotal end portion of said resiliently deformable means is oriented to a center of said support leg means, wherein a hole is formed in the bottom wall of said support leg means at a point adjacent to either of said one and another ends of said support leg means, wherein a first securing pin is provided in said securing end portion of said resiliently deflectable strain means at a point near to said either of said one and another ends of said support leg means, said first securing pin having an end fixedly connected with said bottom side of said vehicle seat, wherein a second securing pin of a fusible property having a head portion and an end is provided in said securing end portion of said resiliently deflectable strain means at a point distant from said either of said one and another ends of said support leg means, such that said end of the second securing pin is fused in said bottom side of said vehicle seat, while said head portion of the second securing pin is disposed on the lower side of said resiliently deformable means, with one predetermined space given between said head portion of the second securing pin and said bottom wall of said support leg means, and wherein, when a normal downward load is applied to the vehicle seat, a downward deflection of said deflectable portion of said resiliently deflectable strain means is caused, in response to which, said strain gauge means detects an amount of the downward deflection and emits a corresponding value indicative of an amount of said load, and wherein, when an excessive great downward load is applied to the vehicle seat, causing the resiliently deflectable strain means to deflect downwardly to a level in excess of said one predetermined space, said head portion of said second securing pin is brought to contact with said bottom wall of said support leg means, thereby protecting said deflectable portion against a deflection in excess of a tolerable range in which the strain gauge means works for detection of the amount of deflection.

2. The structure as claimed in claim 1, wherein, said bottom wall of said support leg means has an inner surface and an outer surface, wherein said first securing pin is of a rivet-type pin having: a large-diameter portion smaller in diameter than said hole of said support leg means; a small-diameter portion having said end which can be riveted; and a head portion formed on said large-diameter portion, said head portion being larger in diameter than said hole of said support leg means, wherein said end of said small-diameter portion extends upwardly through said securing end portion of said resiliently deflectable strain means and is riveted to said bottom side of said vehicle seat, wherein said large-diameter portion extends downwardly through said hole of said support leg means, wherein said head portion of the first securing pin is normally positioned outwardly of said bottom wall of said support leg means, such that another predetermined space is given between said first securing pin head portion and said outer surface of said bottom wall of said support leg means, and wherein said head portion of said second securing pin is normally positioned inwardly of said support leg means, such that said one predetermined space is given between said second securing pin head portion and said inner surface of said bottom wall of said support leg means, whereby, when an excessive great upward load is applied to the vehicle seat, causing the resiliently deflectable strain means to deflect upwardly to a level in excess of said another predetermined space, said head portion of said first securing pin is brought to contact with said outer surface of said bottom wall of said support leg means, thereby protecting said deflectable portion of said resiliently deflectable strain means against a deflection in excess of said tolerable range.

3. The structure as claimed in claim 1, wherein said resiliently deflectable means comprises at least two strain elements, wherein one of said at least two strain elements is disposed at a point near to said one end of said support leg means, while another of said at least two strain elements is disposed at a point near to said another end of said support leg means, and wherein each of said at least two strain elements has said elongated body, said upper side, said lower side, said securing end portion, said pivotal end portion, and said deflectable portion, and wherein said deflectable portion is smaller in thickness than said securing end portion and said pivotal end portion.

4. In combination with a floor of vehicle and a vehicle seat, a structure for securing a load detection means under a bottom side of said vehicle seat and in a support leg means for supporting said vehicle seat upon said floor of vehicle, said support leg means including: a bottom wall having an inner surface and an outer surface; one end facing to a side forwardly of said vehicle seat; and another end facing to a side backwardly of said vehicle seat, wherein said upper rail is fixed to said bottom side of said vehicle seat, wherein a slide rail device is provided between said load detection means and said bottom side of said vehicle seat, said slide rail device comprising: a lower rail fixed to said bottom side of said vehicle seat, said lower rail having a flat bottom surface and one end; and an upper rail slidably fitted via a plurality of rollers in said lower rail, said plurality of rollers being movably interposed between said flat bottom surface of said lower rail and said upper rail, wherein said load detection means is adapted to detect a load applied from an occupant on said vehicle seat and comprising: a resiliently deflectable strain means having an elongated body extending along a fore-and-aft direction of said vehicle seat; an upper side facing to said bottom side of said vehicle seat; a lower side facing to said bottom wall of said support leg means, a securing end portion; a pivotal end portion; and a deflectable portion defined between said securing and pivotal end portions; and a strain gauge means fixedly attached to said deflectable portion, wherein said resiliently deflectable strain means is rotatably journalled at the pivotal end portion thereof by a pivot pin within said support leg means, such that said securing end portion of said resiliently deflectable strain means is disposed adjacent to either of said one and another ends of said support leg means, whereas said pivotal end portion of said resiliently deformable means is oriented to a center of said support leg means, wherein a first hole is formed in said flat bottom surface of said lower rail at a point near to said either of said one and another ends of said support leg means;

wherein a second hole is formed in said flat bottom surface of said lower rail at a point distant from said either of said one and another ends of said support leg means;

wherein a hole formed in said bottom wall of said support leg means in alignment with said first hole;

wherein a first securing pin of rivet type is provided, which has: a large-diameter portion smaller in diameter than said hole of said support leg means; a small-diameter portion having one end which can be riveted; and a head portion formed on said large-diameter portion, said head portion being larger in diameter than said hole of said support leg means, wherein said first securing pin is fixed in said securing end portion of said resiliently deformable strain means at a point near to said one end of said support leg means, such that said end of said small-diameter portion extends upwardly through said securing end portion of said resiliently deformable strain means and is riveted to said bottom side of said vehicle seat, while said large-diameter portion extends downwardly through said hole of said support leg means, and that said head portion is normally positioned outwardly of said bottom wall of said support leg means, such that a first predetermined space is given between said head portion and said outer surface of said bottom wall of said support leg means;

wherein a second securing pin of a fusible property having a head portion and an end is fixedly provided in said securing end portion of said resiliently deformable strain means at a point distant from said one end of said support leg means, such that said end of the second securing pin is fused and fixed in said second hole so as to be flush with said flat bottom surface of said lower rail, while said head portion of the second securing pin is disposed on the lower side of said resiliently deformable strain means, with a second predetermined space given between said head portion of the second securing pin and said inner surface of said bottom wall of said support leg means; and wherein, when a normal downward load is applied to the vehicle seat, a deflection of said deflectable portion of said resiliently deflectable strain means is caused, in response to which, said strain gauge means detects an amount of the deflection and emits a corresponding value indicative of an amount of said load, and wherein, when an excessive great downward load is applied to the vehicle seat, causing the resiliently deflectable strain means to deflect downwardly to a level in excess of said second predetermined space, said head portion of said second securing pin is brought to contact with said inner surface of said bottom wall of said support leg means, and by contrast, when an excessive great upward load is applied to the vehicles seat, causing the resiliently deflectable strain means to deflect upwardly to a level in excess of said first predetermined space, said head portion of said first securing pin is brought to contact with said outer surface of said bottom wall of said support leg means, so that said deflectable portion of said resiliently deflectable strain means is protected against a deflection in excess of a tolerable range in which the strain gauge means works for detection of the amount of deflection.

* * * * *